Patented Aug. 14, 1951

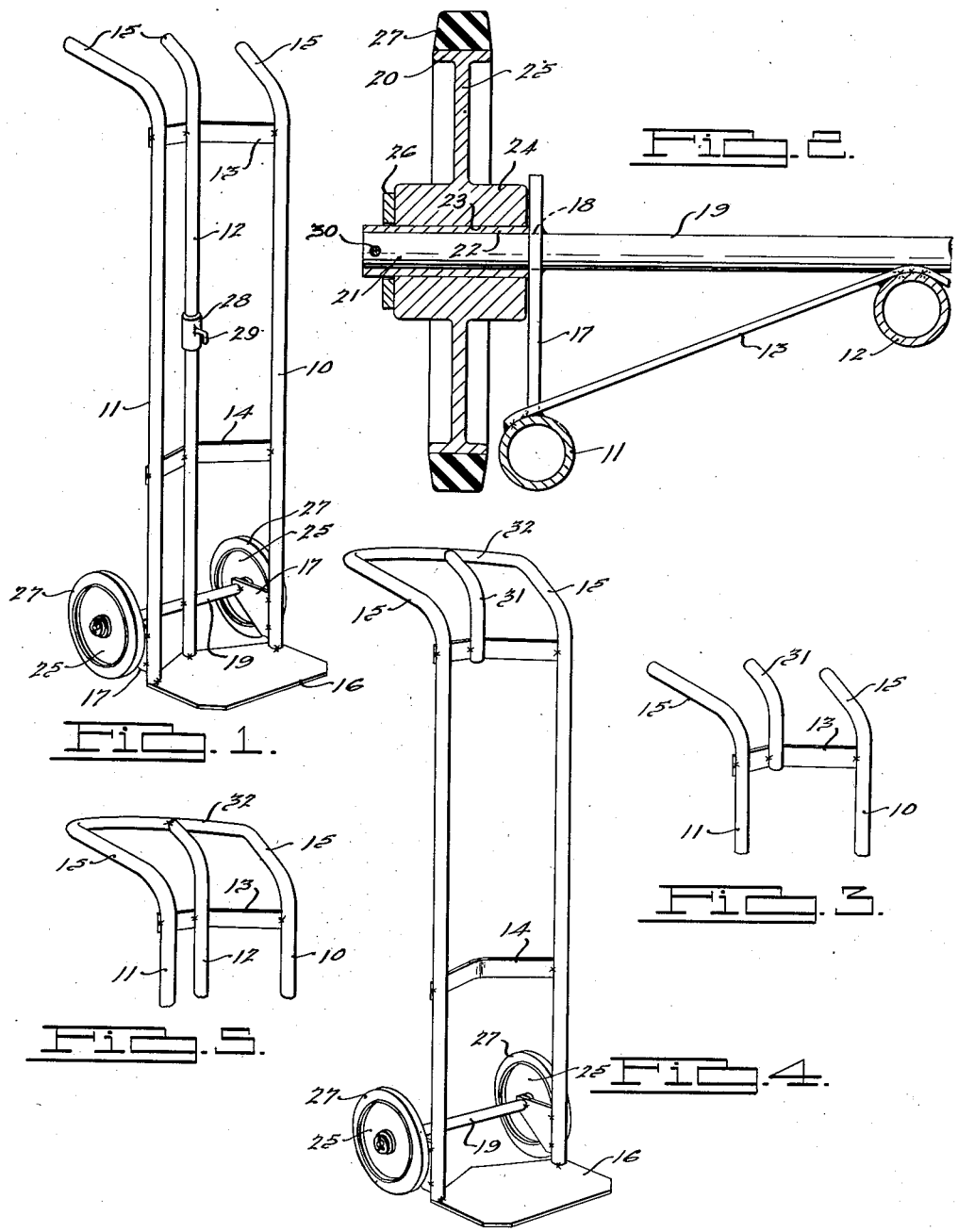

2,564,248

UNITED STATES PATENT OFFICE 2,564,248

HAND TRUCK

Joseph C. Chenette, Flat Rock, Mich.

Application April 26, 1947, Serial No. 744,214

2 Claims. (Cl. 280—56)

This invention relates to hand trucks and particularly to a hand truck of tubular construction.

The hand truck of the present invention comprises a pair of tubular elements interconnected by V-shaped straps to form the handles and the side framing elements having on the bottom a plate upon which the articles to be transported may rest. The ends of the frame elements also have brackets through which a shaft for the wheels project and is welded to prevent the shaft from rotating. A central tubular frame element may be employed, extending from the bottom plate and welded to the cross members to form a third handle and frame element centrally of the two side handles. The side frame handles may be joined at the ends to form a transverse handle bar to which the central handle portion, when employed, may be welded.

A removable sleeve is supported on each end of the shaft engaged by the hub of the wheel on which it rotates. The wheel is retained in position on the sleeve by a washer disposed thereover and the sleeve and washer are retained in position by a cotter pin or similar holding element. The sleeve is retained against rotation and the shaft is protected against wear. When the sleeve and hub have worn a substantial amount, they both may be replaced to provide a bearing surface for the hub having the original minimum amount of clearance. The various elements of the truck may be made of steel, aluminum, magnesium or other metal, depending upon whether lightness, strength or cost are factors in its construction.

Accordingly, the main objects of the invention are: to provide a hand truck having two side frame elements and a central frame element offset rearwardly therefrom terminating in three handles at the top of the truck; to provide a truck with three frame elements to which the wheel supporting shaft and article supporting plate are secured; to provide a hand truck having a frame to which a fixed shaft is secured having replaceable nonrotatable sleeves on the ends on which the wheels operate to protect the shaft against wear; to provide a wheel assembly for a fixed axle embodying a replaceable sleeve on which the wheel is retained for rotation on the surface of the sleeve by a cotter pin which secures the sleeve on the ends of the axle against rotation; and, in general, to provide a hand truck of unique construction which is economical of manufacture.

Other objects and features of novelty of the invention will be specifically pointed out or will become apparent when referring, for a better understanding of the invention, to the following description taken in conjunction with the accompanying drawing, wherein:

Figure 1 is a view in perspective of a hand truck embodying features of the invention;

Fig. 2 is an enlarged broken sectional view taken through the wheel of the truck illustrated in Fig. 1;

Fig. 3 is a view of structure, similar to that illustrated in Fig. 1, showing a further form of the invention;

Fig. 4 is a view of the structure illustrated in Fig. 3, showing a still further form of the invention, and Fig. 5 is a view of the structure illustrated in Fig. 4, illustrating a further form of the invention.

Referring more particularly to Figs. 1 and 2, the structure of the present invention embodies side frame elements 10 and 11 which are herein illustrated as of tubular metal construction, although it is to be understood that the frame elements may be of other forms such as channel, angular and the like, and may be made of other material than metal. A central frame element 12 is also provided for the truck, offset rearwardly from a plane through the side elements 10 and 11. The three elements are interconnected by braces 13 and 14 which are welded or otherwise secured thereto. The braces are of angular shape, as illustrated more specifically in Fig. 2, to joint with the central frame element 12 disposed rearwardly of the side frame elements 10 and 11.

The upper ends of the frame elements 10, 11 and 12 are rearwardly formed to provide handles 15 by which the truck may be manipulated. The bottom ends of the elements 10, 11 and 12 are joined to an article supporting plate 16 which is welded to the ends, as clearly illustrated in Fig. 1. Axle supporting brackets 17 have one edge welded to the outer elements 10 and 11 near the ends thereof adjacent to the plate 16 and are provided with an aperture 18 through which an axle 19 extends and to which the axle is welded to prevent rotation. The axle is also welded to the central frame element 12. In the truck so far described, all of the parts, including the axle, are welded in firm fixed relation to each other.

The protruding ends 21 of the axle have a removable sleeve 22 placed thereover to form a bearing surface for the wall of the aperture 23 of the hub 24 on the wheel 25. A washer 26 is disposed over the sleeve 22 and is secured against endwise displacement by a cotter key or like holding element 30 which extends through the sleeve and the ends 21 of the axle 19 to secure the sleeve 22 against rotation. The wheel 25 may be of any type and is herein illustrated as a cast wheel having on the peripheral rim 26 thereof a solid rubber tire 27 which is vulcanized or otherwise secured thereto. A sleeve 28 may be provided on the central frame element 12 in slidable relation therewith, having a hooked finger 29 welded or otherwise secured thereto for engaging the chime of a barrel edge or the edge of a box or the like for securing it in fixed relation to the frame elements when resting upon the plate 16.

In the truck so far described, the provision of the three handles 15 was found to be of substantial advantage since, when an operator uses one hand to balance a load, the other hand may grasp the central handle and manipulate the truck. It was found to be much simpler to operate from a central handle than when attempting to manipulate the truck with a single hand when grasping one or the other of the side handles 15.

Different forms of frame to be employed for the truck are illustrated in Figs. 3, 4, 5 and 6. In Fig. 3, a short handle portion 31 is provided on the upper brace 13, the portion of the element 12 below the brace, as provided on the truck of Fig. 1, having been eliminated.

In Fig. 4 a construction similar to that of Fig. 3 is illustrated, with the exception that the handles on the elements 10 and 11 are joined by a transverse portion 32, making the frame elements a single U-shaped member having a handle portion 31 from the brace 13 joined thereto.

In Fig. 5, a similar type of structure as illustrated in Fig. 4 is shown, wherein the central frame element 12 is utilized, having the end portion joined to the brace 32 interconnecting the handles 15.

In all of the various constructions illustrated, the frame is made up of elements, including the axle, disposed in fixed bracing relation to each other. The renewable sleeves and the wheels employed on the ends 21 of the fixed axle may be replaced without any damage to the ends of the fixed axles 19. When the wheel is renewed, the original clearance is provided between the outer surface of the sleeve 22 and the inner surface 23 of the hub 24. While various arrangements of the frame elements and handles are illustrated, it is believed that all of the different forms illustrated fall in the single concept of the invention.

What is claimed is:

1. In a hand truck, side frame elements having handle portions on the upper end, an article supporting plate secured to the lower ends of the frame elements, rearwardly extending brackets secured to the frame elements, an axle welded to the brackets to extend therebeyond, removable sleeves on the projecting ends of the axle on which wheels may be supported, washers on said sleeves near the outer ends thereof, spaced cross members of V shape spanning the frame elements and secured thereto, and a third frame element secured medially of the side frame members rearwardly thereof to the cross members, the upper end of the third frame element extending rearwardly to form a handle portion.

2. In a hand truck, side frame elements having handle portions on the upper end, an article supporting plate secured to the lower ends of the frame elements, rearwardly extending brackets welded to the frame elements, an axle welded to the brackets to extend therebeyond so that wheels may be secured thereon beyond the brackets, cross members of V shape spanning the frame elements and secured thereto and extending rearwardly therefrom, and a handle extending from one of the cross members rearwardly between the handle portions of the side frame members.

JOSEPH C. CHENETTE.

REFERENCES CITED

The following references are of record in the file of this patent:

UNITED STATES PATENTS

| Number | Name | Date |
|---|---|---|
| D. 110,110 | Eagleson | June 14, 1938 |
| D. 145,447 | Johann | Aug. 20, 1946 |
| 699,034 | Sullivan et al. | Apr. 29, 1902 |
| 1,011,334 | Ewald | Dec. 12, 1911 |
| 1,033,141 | Wood | July 23, 1912 |
| 1,045,298 | Jones | Nov. 26, 1912 |
| 1,327,338 | Levinson et al. | Jan. 6, 1920 |
| 1,429,918 | Allen | Sept. 26, 1922 |
| 1,672,130 | Lamothe | June 5, 1928 |
| 2,263,879 | Jorgensen | Nov. 25, 1941 |
| 2,368,752 | Duis | Feb. 6, 1945 |
| 2,373,279 | Vogt | Apr. 10, 1945 |
| 2,396,953 | Kirchdorfer | Mar. 16, 1946 |

FOREIGN PATENTS

| Number | Country | Date |
|---|---|---|
| 59,801 | Austria | June 25, 1913 |